US012625290B2

(12) United States Patent
Liu et al.

(10) Patent No.: US 12,625,290 B2
(45) Date of Patent: May 12, 2026

(54) METHOD AND SYSTEM OF IMAGING HYDROCARBON RESERVOIRS USING ADAPTIVE APERTURE TAPERING IN KIRCHHOFF DEPTH MIGRATION

(71) Applicant: SAUDI ARABIAN OIL COMPANY, Dhahran (SA)

(72) Inventors: Yujin Liu, Beijing (CN); Hongwei Liu, Dhahran (SA); Fuhao Qin, Dhahran (SA); Yi He, Beijing (CN)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 519 days.

(21) Appl. No.: 18/028,149

(22) PCT Filed: Sep. 23, 2022

(86) PCT No.: PCT/CN2022/120735
§ 371 (c)(1),
(2) Date: Mar. 23, 2023

(87) PCT Pub. No.: WO2024/060171
PCT Pub. Date: Mar. 28, 2024

(65) Prior Publication Data
US 2024/0302555 A1     Sep. 12, 2024

(51) Int. Cl.
*G01V 1/34* (2006.01)
*E21B 7/04* (2006.01)
(Continued)

(52) U.S. Cl.
CPC .............. *G01V 1/345* (2013.01); *G01V 1/282* (2013.01); *G01V 1/301* (2013.01); *G01V 1/303* (2013.01);
(Continued)

(58) Field of Classification Search
CPC ........ G01V 1/345; G01V 1/282; G01V 1/301; G01V 1/303; G01V 2210/512; G01V 2210/66; E21B 7/04
(Continued)

(56) References Cited

U.S. PATENT DOCUMENTS 5,629,904 A     5/1997  Kosloff et al.
6,131,071 A    10/2000  Partyka et al.
(Continued)

FOREIGN PATENT DOCUMENTS

CN     101937100 A     1/2011
CN     110673213 A     1/2020

OTHER PUBLICATIONS

International Search Report and Written Opinion issued in corresponding International Application No. PCT/CN2022/120735, mailed Jun. 16, 2023 (8 pages).
(Continued)

*Primary Examiner* — Michael P Nghiem
(74) *Attorney, Agent, or Firm* — Osha Bergman Watanabe & Burton LLP

(57) ABSTRACT

A method (600) and a system (1000) for generating an adaptive migration taper for a pre-stack seismic dataset are disclosed. The method (600) includes obtaining the pre-stack seismic dataset (602) and a seismic velocity model of a subterranean region (604). The method (600) also includes generating the adaptive migration taper based, at least in part, on the pre-stack seismic dataset (606), and forming a migrated seismic image using a migration function, the seismic velocity model, the pre-stack seismic dataset, and the adaptive migration taper (608). The method (600) further includes determining a location of a hydrocarbon reservoir based, at least in part, on the migrated seismic image (610).

9 Claims, 11 Drawing Sheets

(51) Int. Cl.
G01V 1/28 (2006.01)
G01V 1/30 (2006.01)

(52) U.S. Cl.
CPC .......... *E21B 7/04* (2013.01); *G01V 2210/512*
(2013.01); *G01V 2210/66* (2013.01)

(58) Field of Classification Search
USPC ......................................................... 702/14
See application file for complete search history.

(56) References Cited

U.S. PATENT DOCUMENTS

| | | |
|---|---|---|
| 6,826,484 B2 | 11/2004 | Martinez et al. |
| 9,702,997 B2 | 7/2017 | Sava et al. |
| 10,338,253 B2 | 7/2019 | Frijlink et al. |
| 2014/0200814 A1 | 7/2014 | Guillaume et al. |
| 2014/0293744 A1 | 10/2014 | Zhang |
| 2014/0324358 A1 | 10/2014 | Kitchenside |
| 2016/0320512 A1 | 11/2016 | Zhao et al. |
| 2022/0043175 A1* | 2/2022 | Liu .......................... G01V 1/32 |
| 2023/0350090 A1* | 11/2023 | Chen ...................... G01V 1/303 |

OTHER PUBLICATIONS

K. Liu et al., "Adaptive Tapering In the Wavefield Extrapolation", 2004, SEG Annual Meeting, SEG-2004-0965, pp. 1-4 (4 pages).
A. Klokov et al., "Selecting an optimal Aperture in Kirchhoff Migration Using Dip-ngle Images", Geophysics, 2013, vol. 78, No. 6, pp. 1-33 (33 pages).

* cited by examiner

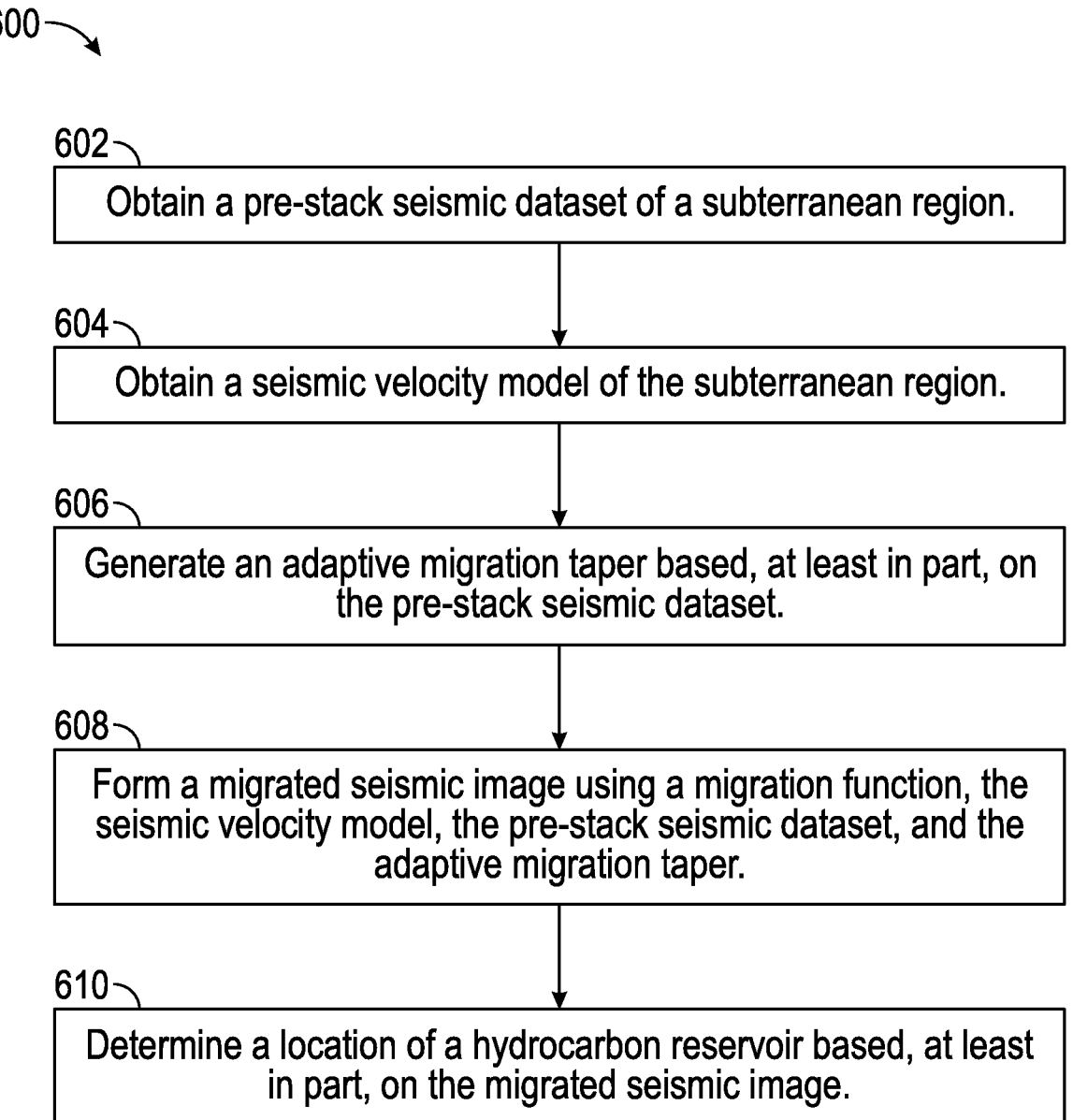

600

602
Obtain a pre-stack seismic dataset of a subterranean region.

604
Obtain a seismic velocity model of the subterranean region.

606
Generate an adaptive migration taper based, at least in part, on the pre-stack seismic dataset.

608
Form a migrated seismic image using a migration function, the seismic velocity model, the pre-stack seismic dataset, and the adaptive migration taper.

610
Determine a location of a hydrocarbon reservoir based, at least in part, on the migrated seismic image.

1004 ⟍
| Seismic acquisition system |

1006 ⟍
| Seismic processing system |

1008 ⟍
| Seismic interpretation workstation |

950 ⟍
| Wellbore planning system |

900 ⟍
| Drilling system |

METHOD AND SYSTEM OF IMAGING HYDROCARBON RESERVOIRS USING ADAPTIVE APERTURE TAPERING IN KIRCHHOFF DEPTH MIGRATION

BACKGROUND

In the oil and gas industry, seismic surveying is commonly used to investigate subterranean structure, and subsequently in the evaluation and location of oil and gas reservoirs. In seismic surveys, a seismic source generates seismic waves which propagate through the subterranean region, reflect and refract from subterranean structure, and are subsequently detected by seismic receivers. The seismic receivers detect and store a time-series of samples of earth motion caused by the seismic waves. The collection of time-series samples recorded at multiple receiver locations generated by a seismic source at multiple seismic source locations constitutes a seismic dataset.

A seismic dataset is typically processed to determine the structure of the subsurface. As part of the processing flow, seismic reflectors are imaged using migration methods such as Kirchhoff depth migration. Seismic datasets may cover large subterranean regions and may also be finely sampled, yielding large amounts of data. Therefore, computationally efficient methods for processing seismic datasets are critical to successfully imaging the subsurface.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to methods for generating an adaptive migration taper for a pre-stack seismic dataset. The methods include obtaining a pre-stack seismic dataset and a seismic velocity model of a subterranean region. The methods also include generating an adaptive migration taper based, at least in part, on the pre-stack seismic dataset, and forming a migrated seismic image using a migration function, the seismic velocity model, the pre-stack seismic dataset, and the adaptive migration taper. The methods further include determining a location of a hydrocarbon reservoir based, at least in part, on the migrated seismic image.

In general, in one aspect, embodiments disclosed herein relate to a non-transitory computer readable medium storing a set of instructions, executable by a computer processor, the set of instructions including functionality for receiving a pre-stack seismic dataset and a seismic velocity model of a subterranean region. The set of instructions further including functionality for generating an adaptive migration taper based, at least in part, on the pre-stack seismic dataset, and forming a migrated seismic image using a migration function, the seismic velocity model, the pre-stack seismic dataset, and the adaptive migration taper. The set of instructions still further including functionality for determining a location of a hydrocarbon reservoir based, at least in part, on the migrated seismic image.

In general, in one aspect, embodiments disclosed herein relate to a system. The system includes a seismic acquisition system configured to obtain a pre-stack seismic dataset of a subterranean region; a seismic processing system configured to receive the pre-stack seismic dataset and a seismic velocity model of the subterranean region and to generate an adaptive migration taper based, at least in part, on the pre-stack seismic dataset, and to form a migrated seismic image using a migration function, the seismic velocity model, the pre-stack seismic dataset, and the adaptive migration taper; and a seismic interpretation workstation configured to determine a location of a hydrocarbon reservoir based, at least in part, on the migrated seismic image.

Other aspects and advantages of the claimed subject matter will be apparent from the following description and the appended claims.

BRIEF DESCRIPTION OF DRAWINGS

FIG. 6 shows a flowchart in accordance with one or more embodiments.

DETAILED DESCRIPTION

Figure 1:
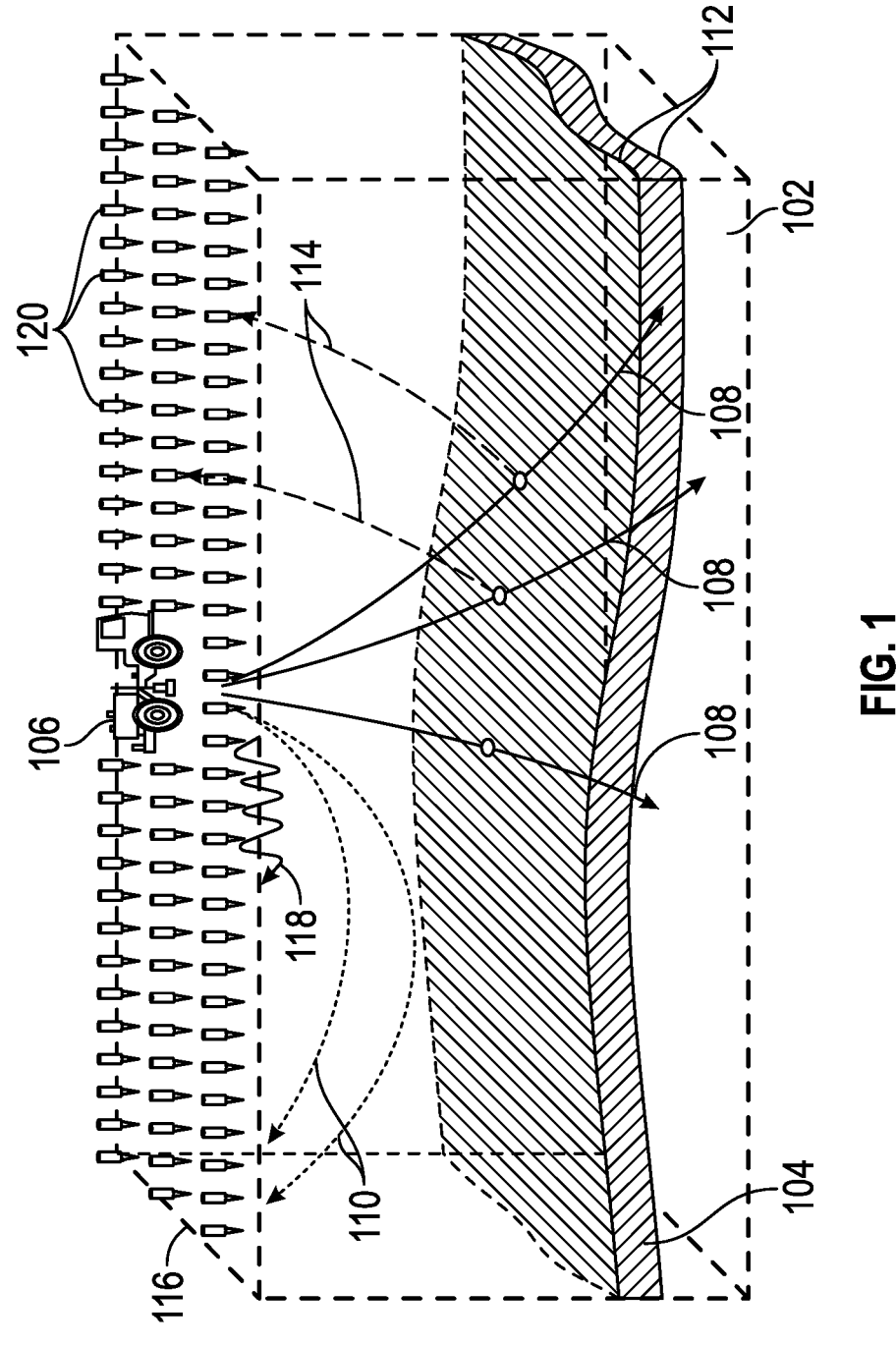
FIG. 1 shows an example of a seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-11, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic trace" includes reference to one or more of such seismic traces.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims may not be introduced, it would be apparent to one of ordinary skill that the subject matter of the dependent claims directed to one or more embodiments may be combined with other dependent claims.

As part of the seismic data processing sequence, migration is performed to properly image subterranean structure. Each data processing step in the seismic processing sequence, including migration, requires parameterization that may be based on budget and/or seismic data requirements. In particular, the summation process within Kirchhoff depth migration requires parameterization of an aperture limit, which must be appropriately tapered. The aperture limit may be used to reduce computational cost or filter dipping noise produced by the migration. In order to produce a high-quality seismic image, the migration aperture limit may vary with depth, and therefore may require an adaptive migration taper.

Disclosed are embodiments that improve migration aperture tapering by computing an adaptive migration taper. The adaptive migration taper can be efficiently implemented in Kirchhoff depth migration to generate a migrated seismic image (also referred to throughout this disclosure as the "seismic image") of the subterranean region. Further, methods are disclosed for determining and drilling wellbore paths within the subterranean region based on the migrated seismic image.

FIG. 1 shows an example of a seismic survey (100) of a subterranean region (102) containing a hydrocarbon reservoir (104). The seismic survey (100) may use a seismic acquisition system to generate and record seismic data. The seismic acquisition system may include one or more seismic sources (106) that generate radiated seismic waves (108). In a land environment, the seismic source (106) may be a dynamite source or one or more seismic vibrators (e.g., a "vibroseis truck"). In a marine or lacustrine environment, the seismic source (106) may be an air gun. The seismic acquisition system may also include a plurality of seismic receivers (120), by which the radiated seismic waves may be recorded. A single activation of the seismic source (106) may be recorded by tens or hundreds of thousands of seismic receivers (120). Typically, in a land environment, the seismic receiver may record the velocity or acceleration of ground motion, while in a marine or lacustrine environment the seismic receiver may record pressure fluctuations caused by the seismic waves.

The radiated seismic waves (108) may propagate along the ground surface (116) as surface waves (118). The radiated seismic waves (108) may also propagate below the surface (116) and return as refracted seismic waves (110) or may be reflected one or more times by geological discontinuities (112) and return to the surface as reflected seismic waves (114). In general, radiated seismic waves (108), surface seismic waves (118), refracted seismic waves (110), and reflected seismic waves (110), may be referred to as simply "seismic waves".

In some embodiments, the seismic waves generated by a single activation of the seismic source (106) are recorded by the seismic receivers (120) as a time-series representing the amplitude of ground-motion at a sequence of discrete times. This time-series may be denoted a seismic "trace." Further, a series of adjacent traces may exhibit a coherent pattern from a recorded wave response of a geological discontinuity (112) and may be referred to as a seismic "event." For example, the seismic event may represent a recorded reflected wave.

The seismic receivers (120) are positioned at a plurality of seismic receiver locations which we may denote $(x_r, y_r)$ where x and y represent orthogonal axes on the surface (116) of the Earth above the subterranean region (102). Thus, the refracted seismic waves (110), surface waves (118), and reflected seismic waves (114) generated by a single activation of the seismic source (106) may be represented as a three-dimensional "3D" volume with axes $D(t, x_r, y_r)$, where $(x_r, y_r)$ represents the location of the seismic receiver (120) and t denotes the time-series at which the amplitude of ground-motion was measured. However, a seismic survey (100) may include recordings of seismic waves generated by a seismic source (106) that is positioned at a plurality of seismic source locations denoted $(x_s, y_s)$. Thus, the seismic volume for a seismic survey (100) may be represented as a five-dimensional volume, denoted $D(t, x_r, y_r, x_s, y_s)$, where $(x_r, y_r)$ are vectors of seismic receiver locations along the x- and y-axes, and $(x_s, y_s)$ are vectors of seismic source locations along the x- and y-axes.

The data collected by the seismic receivers (120) is referred to as a seismic dataset. A seismic dataset must be processed to produce valuable information, such as one or more seismic images or one or more seismic attributes. Seismic processing may be done using a seismic processing system and typically includes subcategories such as pre-processing, noise attenuation, near-surface corrections, velocity analysis, imaging, and attribute generation.

Pre-processing may include sorting (e.g., "demultiplexing") and organizing the data (e.g., "sorting") including integrating the seismic data with geometry and navigation data describing the locations of seismic sources and receivers at the time the seismic data was recorded. The seismic dataset may be sorted and grouped into "gathers" such as common shot or common receiver gathers, according to the spatial coordinates of seismic sources (106) and receivers (120), respectively. In some embodiments, the seismic volume may be sorted and grouped based on a common domain, such as a common midpoint $$(x_m, y_m) = \frac{(x_s, y_s) + (x_r, y_r)}{2},$$

where $(x_s, y_s)$ corresponds to a position of a seismic source (106) location, and $(x_r, y_r)$ corresponds to a position of a seismic receiver (120). A process called "stacking" typically involves summing adjacent traces within a common mid-point (CMP) gather. Before stacking, the dataset is referred to as a "pre-stack" seismic dataset, whereas once the CMP gathers are stacked, the dataset is called a "post-stack" seismic dataset. Another example of a common domain is the common offset domain, where the offset is the distance between source (106) and receiver (120) locations; that is, in one dimension, offset $x_{off} = x_s - x_r$.

Further, pre-processing may include removing ("trace editing") recordings from malfunctioning receivers, seismic wavelet estimation, correcting amplitudes for geometrical-spreading effects, and deconvolution (e.g., "predictive deconvolution") to remove undesirable ringing caused by the recording system or the layered structure of the earth.

Seismic noise may include both coherent source-generated and random noise. For example, coherent source-generated may include ground- and mud-roll and both short- and long-period multiple reverberation from the earth. Random noise may include wind or ocean-swell induced noise, anthropogenic noise from nearby machinery (e.g., pumps) or traffic, and may include interference from seismic surveys being conducted in adjacent areas. Noise attenuation may include high-cut filtering of high-frequency noise, removal of surface waves ("ground-roll") and other linear-propagating noise using frequency-wavenumber (e.g., "f-k" or "tau-p") filtering, and multiple attenuation.

Near-surface corrections may include correcting for "ghosts" (e.g., de-ghosting) caused by the proximity of the surface of the earth or sea surface to the seismic sources and receivers, and for near-surface seismic wave propagation velocity and attenuation effects (e.g., "statics correction").

Acquisition regularization may include compensating for irregularities in spatial sampling during seismic data acquisition. Obstacle avoidance, economics and other external factors may affect the trace spacing across a seismic survey. Acquisition regularization includes basic or advanced interpolation techniques to create uniformly sampled seismic data from irregularly-acquired seismic data.

In order to determine the correct location of reflectors within the subsurface and generate images of geological structure and seismic attributes, it is necessary to determine the seismic wave propagation velocity at points (a "velocity model") within the subsurface region of interest. A velocity model may be determined from in-situ measurements, i.e., in a wellbore and/or from the seismic data itself using a process called "velocity analysis." Various velocity analysis methods are available each with their own computational cost and accuracy characteristics. Velocity analysis may include processes such as "normal-moveout estimation," "tomography," and "full waveform inversion," or frequently, a combination of these methods all of which are familiar to a person of ordinary skill in the art.

Once a velocity model has been determined, an image of seismic wave reflection or scattering may be determined using a method termed "migration." As with velocity analysis, there are various methods of migration familiar to a person of ordinary skill in the art, each with its own computation cost and accuracy characteristics. For example, in order of increasing cost and accuracy, migration methods include Kirchhoff time migration, Kirchhoff depth migration, and reverse-time migration (RTM). In each case a migration method aims to position a signal recorded by a seismic receiver at the location in the surface from which it was scattered or reflected.

Seismic processing may produce a number of 3D images from the seismic data representing different "attributes" of the seismic data. For example, an image of the total amplitude of scattering at each point in the subsurface may be generated. Similarly, the amplitude of scattering within a restricted range of amplitudes may be calculated. Alternatively, the mean, median or mode of the spatial- or temporal-frequency of scattered seismic waves at each point may be imaged. In still other cases, the seismic propagation velocity or seismic propagation attenuation may be used as a seismic attribute.

Although described for convenience above as a linear sequence of steps, a person of ordinary skill in the art will understand that each step of the seismic processing chain is subject to review and quality control (QC) steps of an automatic, statistical, and/or manual nature. For this reason, among others, some seismic processing steps may be repeated immediately or at a later point in the sequence, to produce an improved, refined, or updated result. For example, the seismic velocity model may be updated after an initial migration has been performed. Alternatively, additional temporal-frequency filtering may be inserted into the sequence at numerous points.

Several of these steps, such as seismic imaging and seismic attribute attenuation, require further interpretation to identify the locations within the subsurface at which hydrocarbon accumulations may be present. In some embodiments, the interpretation may occur after the generation of a post-stack seismic image or the seismic attribute. In other embodiments, the interpretation may be performed in parallel or interleaved or integrated into the process of determining the post-stack seismic image or the seismic attribute. Seismic interpretation will be discussed in more detail later.

Returning to the topic of migration, migration is the process by which seismic events are geometrically re-located from their recorded location at the surface, to the location in space or time where the event occurred in the subsurface. For example, migration re-locates energy from dipping reflectors to their true subsurface positions. Due to the nature of migration processes, a migrated seismic data image typically has increased spatial resolution compared to its pre-migration image. In some embodiments, migration may transform pre-processed seismic gathers from a data domain corresponding to a time-series, to an image domain that corresponds to depth data. In the data domain, seismic events in a gather may represent recorded seismic waves in the subsurface, whereas in the image domain, seismic events in a migrated gather may represent geological interfaces in the subsurface. Migration may be two-dimensional (2D) or 3D, where 3D migration is typically required to image seismic data containing geological layers that dip perpendicularly to the direction of acquisition.

Migration types may be defined by the domain in which they are applied: time migration or depth migration. In time migration, the migration process is applied using time coordinates (t,x,y) whereas depth migration is applied to seismic data in depth coordinates (z,x,y). An advantage of depth migration over time migration is that depth migration algorithms can handle lateral velocity variations. Lateral velocity variations are common in complex geological structure such as faults or salt bodies, which are often of interest in seismic interpretation.

Various types of migration algorithms may be used in seismic imaging, the choice of algorithm may depend on budget, subsurface complexity, or imaging requirements. Some examples of commonly implemented migration algorithms are Kirchhoff migration and RTM. In an RTM, seismic gathers may be analyzed by: 1) forward modeling of a seismic wavefield via mathematical modeling, starting with a synthetic seismic source wavelet and a velocity model; 2) backward-propagating the seismic data via mathematical modeling using the same velocity model; 3) cross-correlating the seismic wavefield based on the results of forward modeling and backward propagating; and 4) applying an imaging condition during the cross-correlation to generate a seismic image at each time step. The imaging condition may determine how to form an actual image by estimating cross-correlation between the source wavefield with the receiver wavefield under the basic assumption that the source wavefield represents the down-going wave-field, and the receiver wave-field the up-going wave-field.

For Kirchhoff migration methods, such as a 3D Kirchhoff depth migration, the imaging condition may include a summation of contributions of seismic reflections (signal) along the diffraction travel-time curves and uses principles of constructive and destructive interference to form a seismic image. Kirchhoff migration may be implemented in 2D or 3D, pre- or post-stack and as a time or depth migration. The 3D Kirchhoff pre-stack depth migration (KPSDM) function may be based on an integral form of the wave equation that corresponds to pressure wave displacement and a pressure wave velocity as a function of 3D space and time, given by:

$$I(\xi) = \int W(\xi, m, h)D[t = t_D(\xi, m, h), m, h]dmdh \qquad \text{Equation (1)}$$

$I(\xi)$, which is defined in 3D space as $\xi = (z_\xi, x_\xi, y_\xi)$, is equal to the integral of the data values $D(t,m,h)$ evaluated at the time $t_D(\xi, m, h)$ and weighted by an appropriate factor $W(\xi, m, h)$, where h is the offset (the distance between source and receiver). The domain of integration in Equation (1) is not the entire input space, it is limited to a region $\xi$ around the midpoint m plane. The region $\xi$ is often referred to as the migration aperture. The time shift $t_D(\xi, m, h)$ is given by the total time delay accumulated as the reflections propagate from the source position to the image point $\xi$, and come back to the surface to be recorded at the receiver position. The time delays (stored in a travel-time table or cube) may be computed numerically using a velocity model and ray-tracing, or by solving an eikonal equation over a grid of spatial locations.

Figure 2:
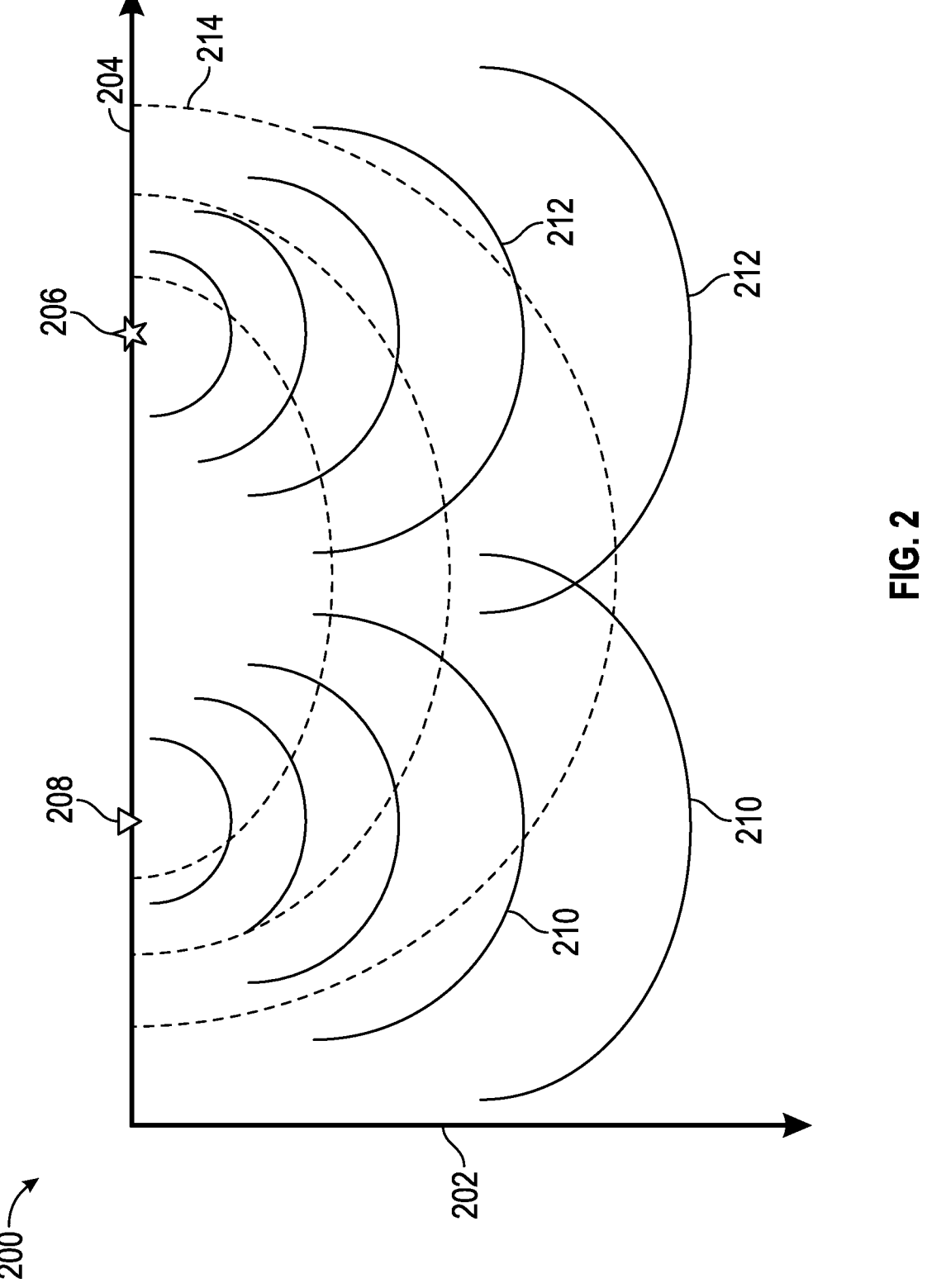
FIG. 2 illustrates a time travel-time cube in accordance with one or more embodiments.

FIG. 2 illustrates a travel-time cube (200), in accordance with one or more embodiments. The vertical axis (202) represents the depth below the surface of the earth (116). The horizontal axis (204) represents position on the surface (116) of the earth, on which a source location (206) and a receiver location (208) reside. The travel-time curves (or isochrons) of a 2D section run through 3D receiver travel-time and source travel-time cubes. Although the term "cube" is frequently used by one of ordinary skill in the art, each 3D travel-time cube may have orthogonal dimensions of different sizes and may have different sampling intervals along each dimension. Further, the sampling interval may vary in size at different points along one or more of the dimensions, in the interest of reducing computational cost.

The left-most set of solid lines (210) represent isochrons of the receiver travel-time cube, $t_r(x,y,z)$, and the right-most set of solid lines (212) represent isochrons of the source travel-time cube, $t_s(x,y,z)$. The dashed lines (214) represent isochrons of the two-way travel-time cube, $t_D(x,y,z)$, that may be given by:

$$t_D(x, y, z) = t_r(x, y, z) + t_s(x, y, z) \qquad \text{Equation (2)}$$

A two-way travel-time cube (200), $t_D(x,y,z)$, for a source location (206) and a receiver location (208), represents the predicted travel-time for a seismic wave to propagate from the source location (206) to a "scattering point" (x,y,z) in the subsurface, plus the predicted travel-time from the scattering point to the receiver location (208). The two-way travel-time cube is invariant with respect to swapping the receiver location (208) and the source location (206). Due to this reciprocal property, in some embodiments, a single travel-time cube may be computed. The travel-time cube may be determined from a seismic velocity model that specifies the seismic propagation velocity for a plurality of points within the subsurface, via ray-tracing or by solving an eikonal equation directly for a plurality of locations. Both the seismic velocity model and the travel-time cube are typically defined on a 3D grid of points, or spatial locations, representing the subsurface. In order to reduce computation time, the computed travel-time grid may be a coarse grid and may vary with depth; however, the travel-time values may be interpolated to a finer grid as required by the input seismic data. In some embodiments, to further reduce the computational cost to generate a travel-time cube, ray-tracing may be limited based on a maximum emergence angle.

In addition to velocity information that may be stored in a travel-time cube, a Kirchhoff depth migration typically requires parameterization for constraints such as the maximum dip to migrate (which defines the "angular aperture") or the maximum aperture width ("spatial aperture"). In particular, the aperture parameters refer to the aperture used in the summation of contributions of seismic reflections, often measured in meters or number of traces. An insufficient aperture may remove steeply dipping events and an excessive aperture may increase computational cost or degrade the migration result in areas with low signal to noise ratio. Faster velocity reflections will migrate farther than slower velocity reflections; consequently, an appropriate aperture typically depends on velocity. Further, velocity typically increases with depth within a seismic section, therefore aperture is may be depth variant (e.g., increase with depth). Aperture tests may be conducted using a subset of the seismic data containing complex or steeply dipping geology.

Figure 3B:
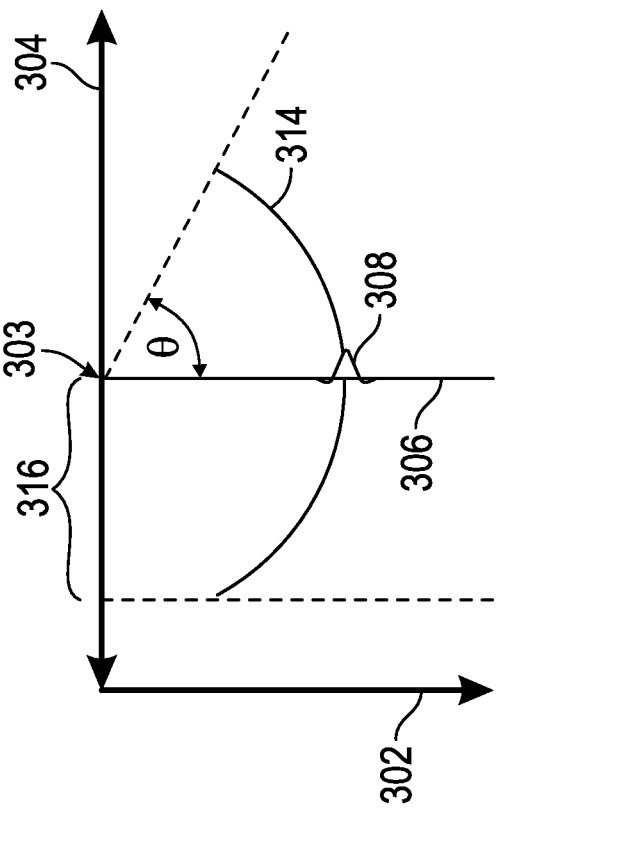
FIGS. 3A and 3B depict examples of impulse responses in accordance with one or more embodiments.
Figure 3A:
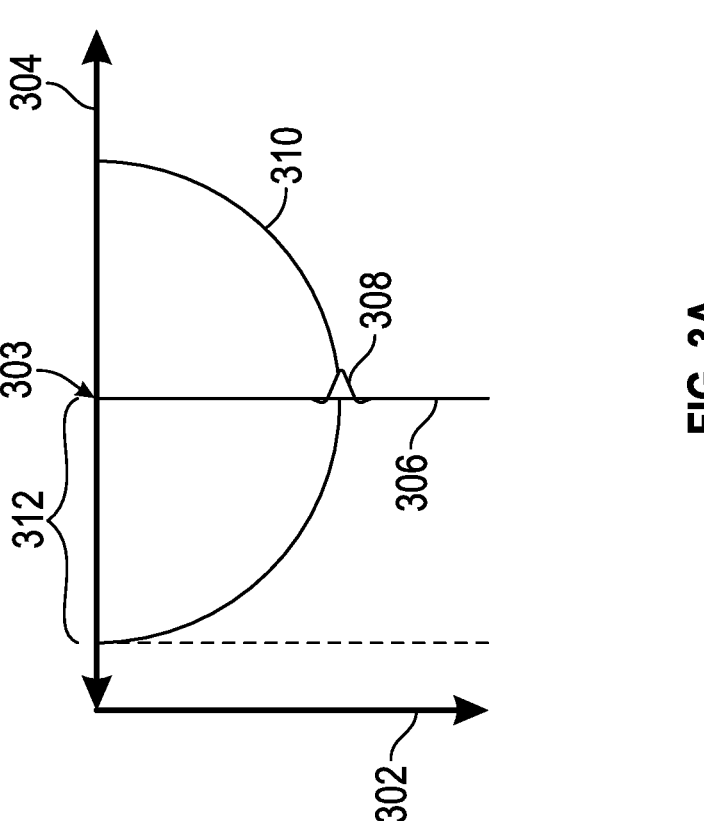

Before migrating the seismic dataset, the migration function may be applied to a single trace or a single wavelet on a single trace. The response of this trace to the migration operator is referred to as the "impulse response." FIGS. 3A and 3B depict examples of impulse responses in accordance with one or more embodiments. In both FIGS. 3A and 3B, the vertical axes (302) represent increasing depth, and the horizontal axes (304) represent increasing offset (distance) in both directions from the center (303). In FIG. 3A, a single trace (306) with an isolated wavelet (308) is migrated using a constant velocity and without any spatial or angular aperture limitations. The resulting impulse response pattern is indicated by the solid line curve (310) with apex at the depth of the wavelet (308) sample. Although there is no aperture limitation in this example, the resulting spatial aperture (312) is determined by the velocity (i.e., the shape of the curve (310)).

FIG. 3B shows the same single trace (306) with an isolated wavelet (308) from FIG. 3A. However, the single trace (306) in FIG. 3B is migrated using a dip-limited migration operator to define the angular aperture, which results in a truncated impulse response (314). The dip-limited migration operator is governed by a maximum dip θ, which is measured from the vertical axis (302). Due to this dip limitation, the actual effective aperture (316) is reduced when compared to the spatial aperture (312) from FIG. 3A. It may be observed that the maximum dip (θ) parameter is related to the spatial aperture. In fact, the actual effective aperture (316) is the result of combining the spatial aperture limit with the angular aperture limit. Analogous to the parameterization of maximum spatial aperture, the maximum angular aperture, controlled by the maximum dip parameter, may be depth-variant and must be carefully tested to ensure steeply dipping events are retained and are adequately migrated. On the other hand, a smaller maximum dip may be useful for noise suppression and reduction in computational cost.

Figure 4:
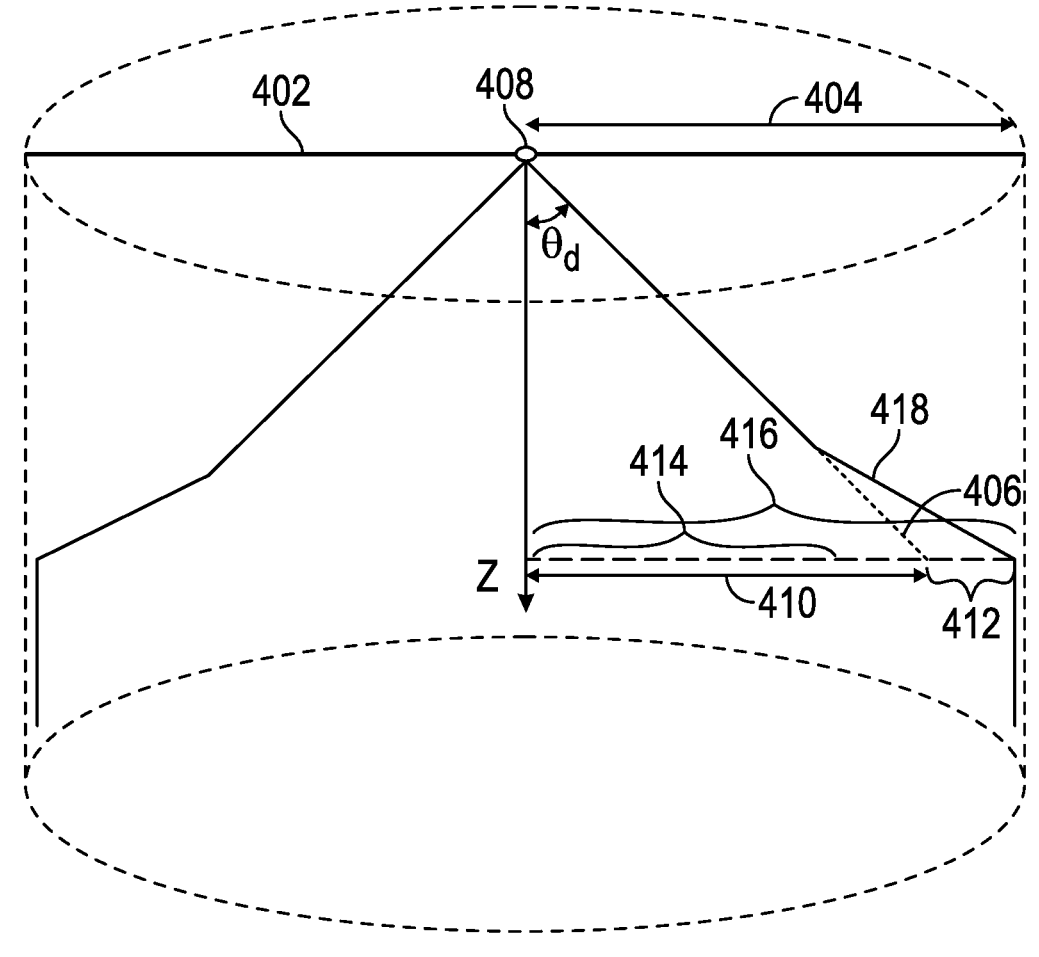
FIG. 4 shows an example of dip-constrained migration aperture in accordance with one or more embodiments.

FIG. 4 shows an example of dip-constrained migration aperture in accordance with one or more embodiments. A target migration line (402) is indicated, with a maximum spatial migration aperture (404) and maximum dip $\theta_d$ parameters specified for depth z. The calculated dip-angle aperture (406) boundary extending from the midpoint (408) is constrained by $\theta_d$ (calculated using the straight-ray assumption) and defines the angular migration aperture (410).

In some embodiments, the maximum dip is be specified for several control points (depths) and then interpolated or extrapolated to every depth point. After interpolation or extrapolation, the angular migration aperture (410) $h_d$ may be determined from the maximum dip and depth pairs ($\theta_d$, z) using the following equation:

$$h_d = z * \tan[\theta_d(z)] \qquad \text{Equation (3)}$$

A taper must also be specified when applying spatial and angular aperture limits. A taper is implemented to reduce artifacts that are caused by sharp boundary truncations. In some embodiments, a taper function may be defined by specifying a taper zone parameter $\epsilon$. The taper boundaries $h_1$ and $h_2$ for migration aperture ha may then be defined by Equations (4) and (5), while taper length $\Delta h$ is given by Equation (6):

$$h_1 = (1 - \epsilon)h_d \qquad \text{Equation (4)}$$

$$h_2 = (1 + \epsilon)h_d \qquad \text{Equation (5)}$$

$$\Delta h = h_2 - h_1 = 2\epsilon h_d \qquad \text{Equation (6)}$$

Further, a dip-constrained weight function $w_{dip}$ may be defined at intervals dependent on h, where h is the horizontal distance from the midpoint of the input trace to the location of the output image point:

$$w_{dip} = \begin{cases} 0, & h > h_2 \\ \dfrac{h_2 - h}{h_2 - h_1}, & h_1 \leq h \leq h_2 \\ 1, & h < h_1 \end{cases} \qquad \text{Equation (7)}$$

Returning to FIG. 4, the taper zone (412) defines a taper around the calculated dip-angle aperture (406) boundary, where the inner taper (414) boundary from Equation (4) and outer taper (416) boundary from Equation (5) are indicated. However, as shown in FIG. 4, the relationship between the spatial migration aperture (404) and calculated dip-angle aperture (406) assumes the ray-path is a straight line, which is inaccurate for heterogeneous velocity models. In most cases, seismic velocity increases with depth and, according to Snell's Law, the propagation angle with respect to the vertical of a ray increases with depth. Therefore, the actual dip angle is typically larger than the dip angle calculated using the straight-ray approximation. That is, the actual effective migration aperture (418) may be larger than the calculated dip-angle aperture (406) at certain depths.

If the travel-time cube used in Kirchhoff migration is fully populated in the image space, the dip-constrained weight function described in Equation (7) will take effect around the calculated dip-angle aperture (406) boundary. However, the ray-tracing required to populate the entire cube is computationally expensive and, as previously mentioned, may be limited by a maximum emergence angle. In this case, the dip-constrained weight function described in Equation (7) may not taper the ray-tracing boundary appropriately. As discussed, a truncated migration impulse response may result in strong boundary artifacts in the migrated output. To illustrate an example of this deficiency, a slowness field is examined.

Seismic slowness s, is the amount of time for a seismic wave to travel a certain distance and is the reciprocal of velocity v; that is, $$s = \frac{1}{v}.$$

Slowness is related to the ray parameter p, which remains constant throughout its path. The ray parameter is computed as $$p = \frac{\sin \alpha}{v},$$

where $\alpha$ is the angle measured from the vertical to the perpendicular direction of the wave front. In other words, slowness is calculated by dividing the travel-time with the straight-line distance from an origination point (either source or receiver location) to the image point.

Figure 5:
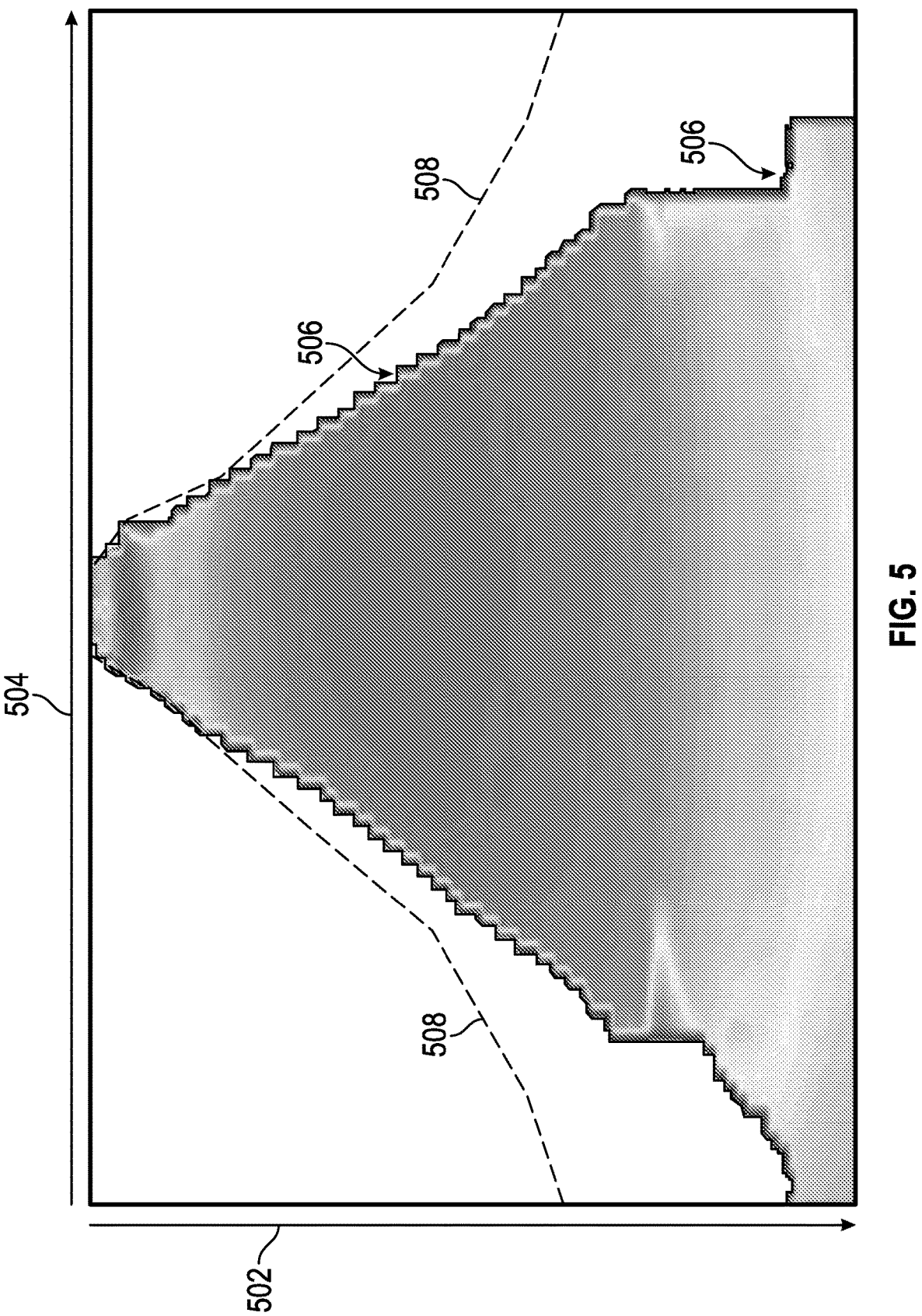
FIG. 5 shows an example of a slowness field in accordance with one or more embodiments.

FIG. 5 shows an example of a slowness field in accordance with one or more embodiments. The slowness values, indicated by various shades of gray, are calculated from the ray-paths in the travel-time cube using the straight-ray assumption. The vertical axis (502) represents time, and the horizontal axis (504) represents increasing distance from a particular spatial location. In this case, the ray-tracing is limited by a maximum emergence angle, so the slowness field is not fully populated, which is indicated by the white areas within the axes (502, 504) outside of the ray-tracing boundary (506). If the actual effective migration aperture (508) boundary falls outside of the ray-tracing boundary (506), the dip-constrained weight function described in Equation (7) may not taper a migration impulse response effectively. To account for cases such as this, an adaptive weight function may be defined.

An adaptive weight function is determined adaptively according to the migration impulse response and produces an adaptive migration aperture taper. It may be defined using a taper zone definition as shown in Equations (4) through (6) along with a depth index $z_h$. For each trace within the dip-limited migration impulse response, the depth index $z_h$ at the boundary (i.e., the first non-zero sample number for the trace) is identified. Then the adaptive weight function acts as a vertical taper such that:

$$w_{adap} = \begin{cases} 0, & z > z_h \\ \dfrac{z - z_h}{\Delta h}, & z_h \leq h \leq z_h + \Delta h \\ 1, & h > z_h + \Delta h \end{cases} \quad \text{Equation (8)}$$

where $\Delta h$ is the taper length, h is the horizontal distance from the midpoint of the input trace to the location of the output image point, and z is the depth of the output image point.

An adaptive migration taper $w_{final}$ may be calculated by multiplying the dip-constrained weight function with the adaptive weight function, so that:

$$w_{final} = w_{dip} * w_{adap} \quad \text{Equation (9)}$$

In some embodiments, both the dip-constrained and adaptive weight functions (and therefore, the adaptive migration taper) may be calculated on-the-fly in the migration kernel. This may not require extra memory and in further embodiments may be implemented for parallel computing in graphics processing unit (GPU) architecture systems. That is, the implementation of the adaptive migration taper is efficient and may not require additional computational cost.

FIG. 6 shows a flowchart in accordance with one or more embodiments. In Step 602 of flowchart (600), a pre-stack seismic dataset of a subterranean region (102) may be obtained. The pre-stack seismic dataset may include a plurality of pre-stack traces and may be acquired via a seismic survey (100) using a seismic acquisition system. The seismic survey may be conducted on a terrestrial surface, i.e., the seismic survey may be a "land" seismic survey.

In Step 604, in accordance with one or more embodiments, a seismic velocity model of the subterranean region (102) may be obtained. In some embodiments, a seismic velocity model may be obtained by performing velocity analysis on the pre-stack seismic dataset. Velocity analysis may include manual velocity picking, tomography, or any other technique known to one ordinarily skilled in the art.

In Step 606, in accordance with one or more embodiments, an adaptive migration taper is generated based on the pre-stack seismic dataset. In some embodiments, a dip-constrained weight function may be generated based on a maximum dip for a specified depth and a first taper length. The first taper length may define a taper zone from which an inner taper and outer taper are computed, as in Equations (4) and (5), respectively.

In other embodiments, an adaptive weight function may be generated using a depth index and a second taper length. The depth index may be determined from a migration impulse response, and the second taper length may define a second taper zone used in Equations (4) and (5). In some embodiments, the second taper length may be the same as the first taper length. In further embodiments, the adaptive migration taper may be a vertical taper, and may be generated by combining the dip-constrained weight function and the adaptive weight function using an operation such as multiplication. The adaptive migration taper may be applied on-the-fly during migration to reduce truncated boundary artifacts.

Figures 7A, 7B:
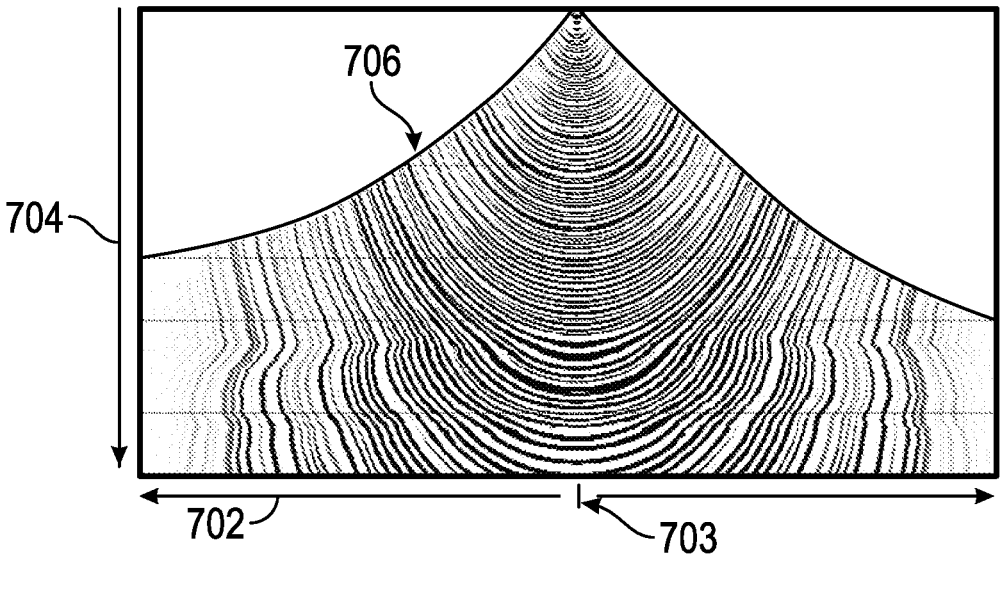
FIGS. 7A and 7B show examples of dip-constrained impulse responses in accordance with one or more embodiments.

FIGS. 7A and 7B show examples of dip-constrained impulse responses in accordance with one or more embodiments. In both FIGS. 7A and 7B, the horizontal axis (702) represents offset (distance), increasing in both directions from the center (703), and the vertical axis (704) represents increasing depth. Specifically, FIG. 7A shows a dip-constrained impulse response with a dip-constrained weight function applied, such as the one defined in Equation (7). One of ordinary skill in the art will appreciate that at the boundary (706) of the impulse response, the energy is truncated sharply, especially at mid and far offsets, which may cause artifacts and degrade the seismic image.

FIG. 7B shows a dip-constrained impulse response with an adaptive migration taper applied; that is, a combination of both the dip-constrained weight function and the adaptive weight function are applied. Here, one of ordinary skill in the art will appreciate that at the boundary (706) of the impulse response, the energy is tapered for all offsets. If the truncated boundary effect is successfully attenuated, the likelihood of boundary artifacts may be reduced in the seismic image.

Returning to flowchart (600) in FIG. 6, in Step 608 a migrated seismic image is formed using a migration function, the seismic velocity model, the pre-stack seismic dataset, and the adaptive migration taper, in accordance with one or more embodiments. The migration function may be a Kirchhoff migration function, based on an integral form of the wave equation that corresponds to pressure wave displacement and a pressure wave velocity as function of three-dimensional space and time. The velocity model may be a pressure wave velocity function and may be converted to a travel-time cube or table using any method known to one ordinarily skilled in the art. In some embodiments, the pre-stack seismic dataset, the travel-time cube, and the adaptive migration taper may be used with the migration function to output a migrated seismic image. The migrated seismic image may be a pre-stack seismic dataset.

In accordance with one or more embodiments, the seismic image may be further processed in a processing sequence typically referred to as "post-processing." Some examples of post-processing are: residual moveout correction, noise attenuation, frequency filtering, or spectral balancing. In general, post-processing is designed to increase the signal to noise ratio of the seismic image. In some embodiments, artifacts generated by the migration may still appear in a post-processed seismic image.

Figure 8A:
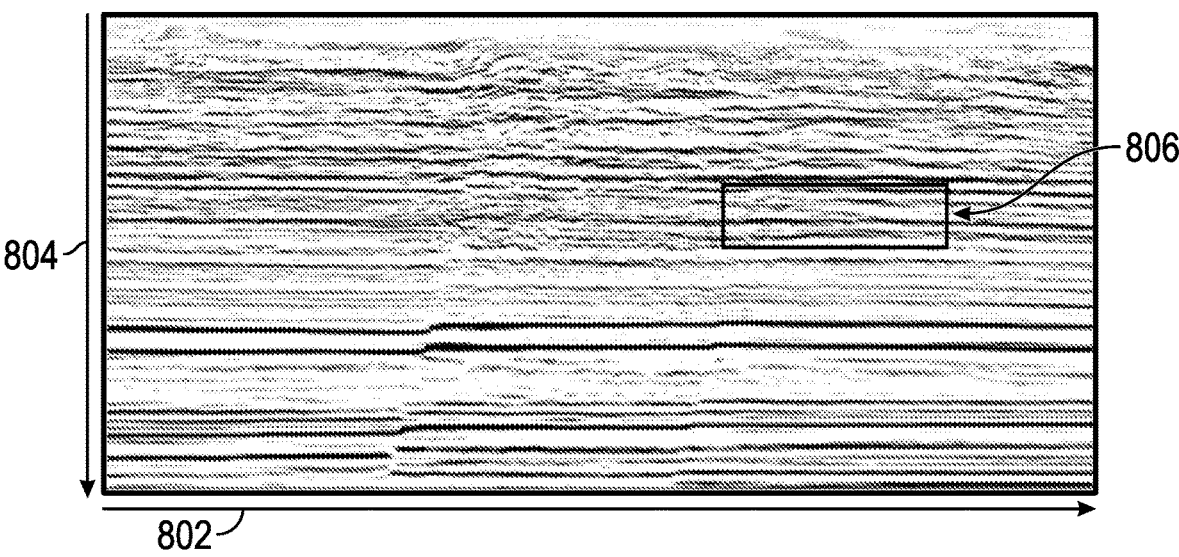
FIGS. 8A and 8B show examples of migrated seismic images in accordance with one or more embodiments.
Figure 8B:
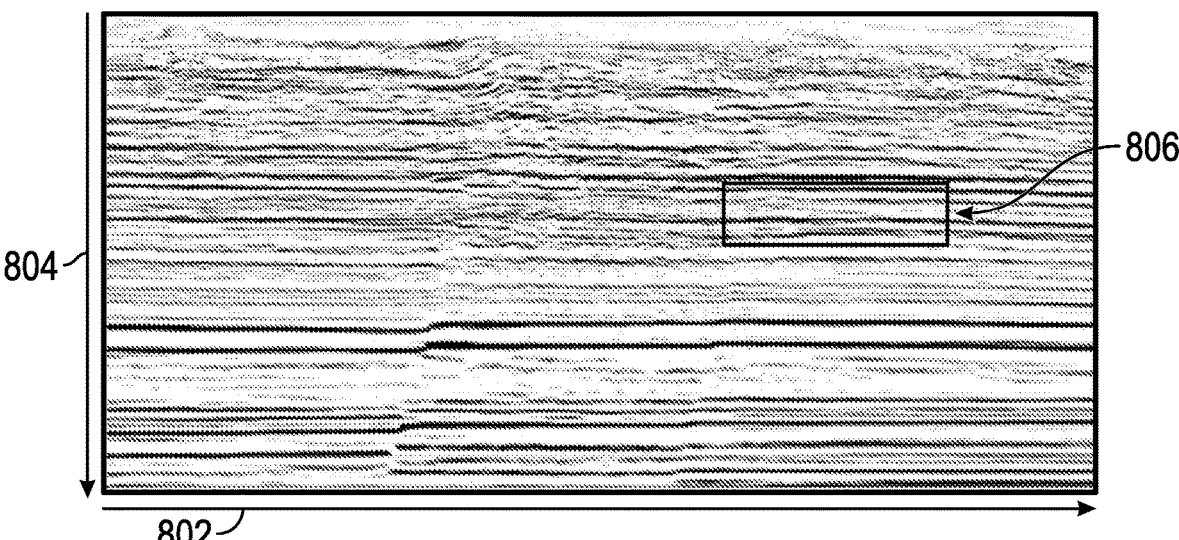

FIGS. 8A and 8B show examples of seismic images in accordance with one or more embodiments. In both FIGS. 8A and 8B, the horizontal axis (802) represents increasing distance from a particular spatial location, and the vertical axis (804) represents increasing depth. The seismic image shown in FIG. 8A is generated from a first migrated seismic image, where, during migration, a dip-constrained weight function was used. The seismic image shown in FIG. 8B is generated from a second migrated seismic image, where, during migration, an adaptive migration taper was used. The sole difference in the generation of the seismic images in each of FIGS. 8A and 8B is the adaptive weight function, i.e. the adaptive migration taper.

A box is drawn on each of the seismic images in FIGS. 8A and 8B, indicating an area of interest (806). In the area of interest of FIG. 8A, false seismic events have been generated due to truncated boundary artifacts during migration. Further, when comparing the area of interest (806) in FIG. 8A to the same area of interest (806) in FIG. 8B, one of ordinary skill in the art will appreciate that the horizons formed by seismic events in FIG. 8B are more coherent than those in FIG. 8A. That is, the seismic image in FIG. 8B, generated using the adaptive migration taper is sharper and has better-defined true seismic events when compared to the seismic image in FIG. 8A. These are subtle but important differences when interpreting a seismic image for use in hydrocarbon exploration.

Returning once again to flowchart (600) in FIG. 6, in Step 610 a location of a hydrocarbon reservoir (104) may be determined, based on the migrated seismic image in accordance with one or more embodiments. The migrated seismic image may be used to determine geological properties in order to locate a hydrocarbon reservoir (104). The process of determining geological properties from a migrated seismic image or seismic attribute image is called seismic interpretation. For example, identifying a discontinuity in an otherwise continuous surface of high amplitude seismic reflections as a geological fault, or identifying a region with anomalously high seismic wave attenuation as indicative of a hydrocarbon gas deposit, are examples of seismic interpretations.

Seismic interpretation may include manual steps, such as "picking" a sparse set of points on a single interpreted undulating geological boundary, and automatic or algorithmic steps, such as picking all the remaining grid points lying on the boundary using the manually picked points as a guide or "seeds".

Often the output of seismic interpretation includes the seismic image, or attribute image, with the interpretation of labelled geological boundaries, faults, well markers, pore fluid contact levels, gas deposits etc., drawn and annotated on the image. In the past, such interpretation was performed using displays of portions of the seismic image printed on paper with the interpretation drawn, originally hand-drawn, on the paper using colored pen or pencils. Now, a seismic interpreter of ordinary skill in the art will, almost without exception, use a seismic interpretation workstation to perform seismic interpretation.

A seismic interpretation workstation may include one or more computer processors and a computer-readable medium (memory) containing instructions executable by the processor. The computer memory may further contain seismic images and/or seismic attributes. The seismic interpretation workstation may also include a display mechanism, usually one or more monitor screens, but sometimes one or more projector, user-wearable goggles or other virtual reality display equipment and a means of interacting with the display, such as a computer mouse or wand. Further, the seismic interpretation workstation may include dedicated hardware designed to expedite the rendering and display of the seismic image, images, or attributes in a manner and at a speed to facilitate real-time interaction between the user and the data. For example, the seismic interpretation workstation may allow the seismic interpreter to scroll through adjacent slices through a 3D seismic image to visually track the continuity of a candidate geological boundary throughout the 3D image. Alternatively, the seismic interpretation workstation may allow the seismic interpreter to manually control the rotation of the view angle of the seismic image so it may be viewed from above, or from the East or from the West, or from intermediate directions.

As for the seismic interpretation system, the computer processor or processors and computer memory of the seismic interpretation workstation may be co-located with the seismic interpreter, while in other cases the computer processor and memory may be remotely located from the seismic interpreter, such as on "the cloud." In the latter case, the seismic or attribute images may only be displayed on a screen, including a laptop or tablet local to the seismic interpreter, who may interact with the computer processor via instructions sent over a network, including a secure network such as a virtual private network (VPN).

The interpreted seismic image may be used, together with other available information, to determine the location of a hydrocarbon reservoir (104) for a subterranean region (102) with a high degree of certainty. Further, the interpreted seismic image may be used to determine locations within a hydrocarbon reservoir (104) for which wellbores may be drilled, safely and economically, to produce the hydrocarbons.

Figure 9:
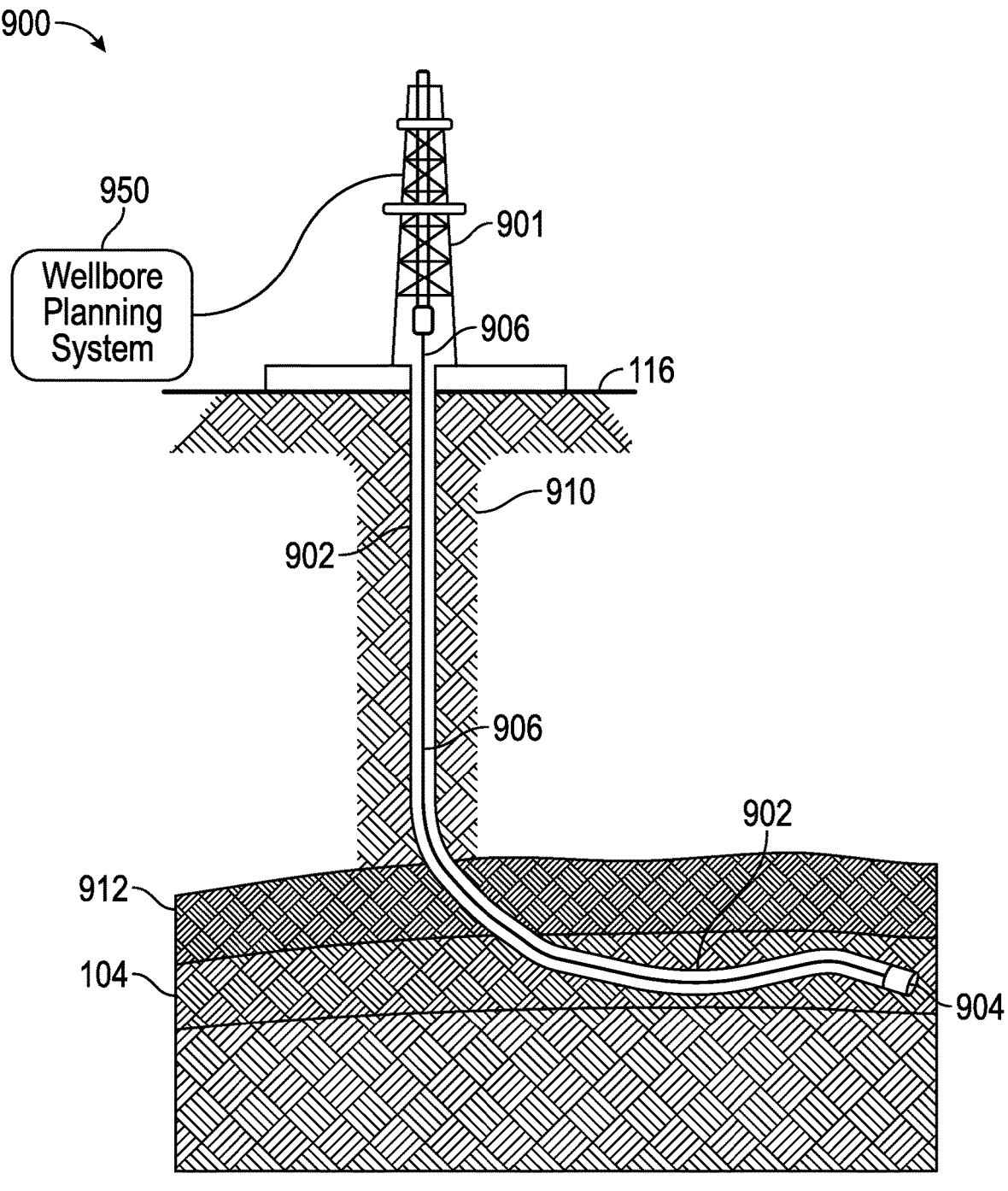
FIG. 9 shows a wellbore drilling system in accordance with one or more embodiments.

FIG. 9 shows a wellbore drilling system (900) in accordance with one or more embodiments. As shown in FIG. 9, a wellbore path (902) may be drilled by a drill bit (904) attached by a drillstring (906) to a drill rig (901) located on the surface (116) of the earth. The wellbore may traverse a plurality of overburden layers (910) and one or more caprock layers (912) to a hydrocarbon reservoir (104). In accordance with one or more embodiments, the seismic image may be used to plan a wellbore path (902) and drill a wellbore guided by the wellbore path (902). The wellbore path (902) may be a curved wellbore path, or a straight wellbore path. All or part of the wellbore path (902) may be vertical, and some wellbore paths may be deviated or have horizontal sections.

Prior to the commencement of drilling, a wellbore plan may be generated. The wellbore plan may include a starting surface location of the wellbore, or a subsurface location within an existing wellbore, from which the wellbore may be drilled. Further, the wellbore plan may include a terminal location that may intersect with the targeted hydrocarbon bearing formation and a planned wellbore path (902) from the starting location to the terminal location. In other words, the wellbore path (902) may intersect a previously located hydrocarbon reservoir (104).

Typically, the wellbore plan is generated based on best available information from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. Furthermore, the wellbore plan may consider other engineering constraints such as the maximum wellbore curvature ("dog-log") that the drillstring (906) may tolerate and the maximum torque and drag values that the wellbore drilling system (900) may tolerate.

A wellbore planning system (950) may be used to generate the wellbore plan. The wellbore planning system (950) may comprise one or more computer processors in communication with computer memory containing the geophysical and geomechanical models, information relating to drilling hazards, and the constraints imposed by the limitations of the drillstring (906) and the wellbore drilling system (900). The wellbore planning system (950) may further include dedicated software to determine the planned wellbore path (902) and associated drilling parameters, such as the planned wellbore diameter, the location of planned changes of the wellbore diameter, the planned depths at which casing will be inserted to support the wellbore and to prevent formation fluids entering the wellbore, and the drilling mud weights (densities) and types that may be used during drilling the wellbore.

A wellbore may be drilled using a drill rig (901) that may be situated on a land drill site, an offshore platform, such as a jack-up rig, a semi-submersible, or a drill ship. The drill rig (901) may be equipped with a hoisting system, which can raise or lower the drillstring (906) and other tools required to drill the well. The drillstring (906) may include one or more drill pipes connected to form conduit and a bottom hole assembly (BHA) disposed at the distal end of the drillstring (906). The BHA may include a drill bit (904) to cut into subsurface rock. The BHA may further include measurement tools, such as a measurement-while-drilling (MWD) tool and logging-while-drilling (LWD) tool. MWD tools may include sensors and hardware to measure downhole drilling parameters, such as the azimuth and inclination of the drill bit, the weight-on-bit, and the torque. The LWD measurements may include sensors, such as resistivity, gamma ray, and neutron density sensors, to characterize the rock formation surrounding the wellbore. Both MWD and LWD measurements may be transmitted to the surface (116) using any suitable telemetry system, such as mud-pulse or wired-drill pipe, known in the art.

To start drilling, or "spudding in" the well, the hoisting system lowers the drillstring (906) suspended from the drill rig (901) towards the planned surface location of the wellbore. An engine, such as a diesel engine, may be used to rotate the drillstring (906). The weight of the drillstring (906) combined with the rotational motion enables the drill bit to bore the wellbore.

The near-surface is typically made up of loose or soft sediment or rock, so large diameter casing, e.g. "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface (116) of the earth.

Drilling may continue without any casing once deeper more compact rock is reached. While drilling, drilling mud may be injected from the surface (116) through the drill pipe. Drilling mud serves various purposes, including pressure equalization, removal of rock cuttings, or drill bit cooling and lubrication. At planned depth intervals, drilling may be paused and the drillstring (906) withdrawn from the wellbore. Sections of casing may be connected and inserted and cemented into the wellbore. Casing string may be cemented in place by pumping cement and mud, separated by a "cementing plug," from the surface (116) through the drill pipe. The cementing plug and drilling mud force the cement through the drill pipe and into the annular space between the casing and the wellbore wall. Once the cement cures drilling may recommence. The drilling process is often performed in several stages. Therefore, the drilling and casing cycle may be repeated more than once, depending on the depth of the wellbore and the pressure on the wellbore walls from surrounding rock. Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

A wellbore drilling system (900) may be disposed at and communicate with other systems in the well environment. The wellbore drilling system (900) may control at least a portion of a drilling operation by providing controls to various components of the drilling operation. In one or more embodiments, the system may receive data from one or more sensors arranged to measure controllable parameters of the drilling operation. As a non-limiting example, sensors may be arranged to measure WOB (weight on bit), RPM (drill rotational speed), GPM (flow rate of the mud pumps), and ROP (rate of penetration of the drilling operation). Each sensor may be positioned or configured to measure a desired physical stimulus. Drilling may be considered complete when a target zone is reached, or the presence of hydrocarbons is established.

Figure 10:
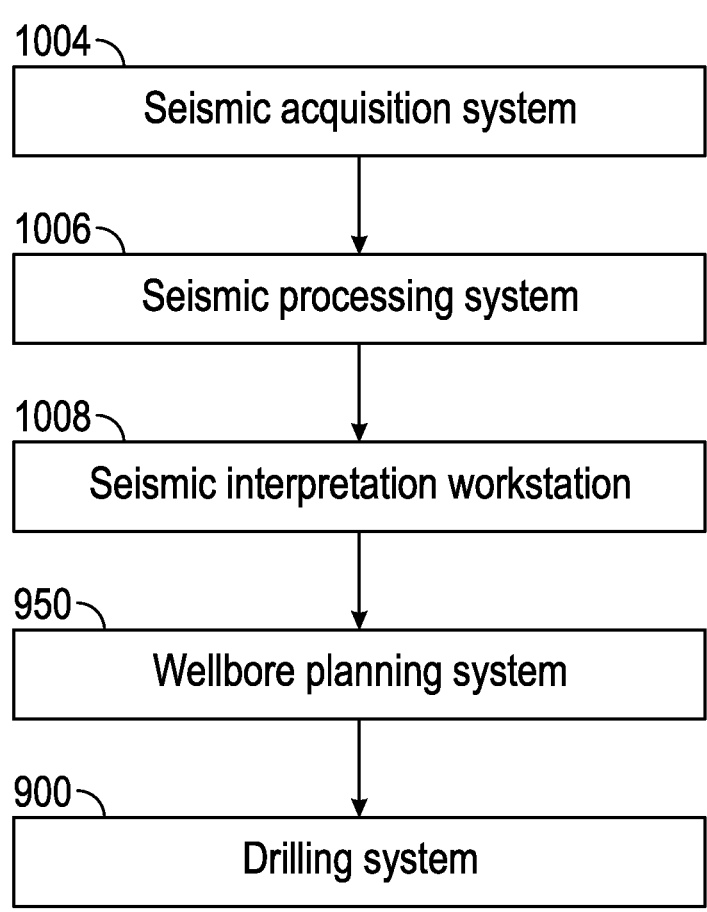
FIG. 10 shows a block diagram of systems in accordance with one or more embodiments.

FIG. 10 shows a block diagram of systems (1000) in accordance with one or more embodiments. Each system may be coupled to one or more other systems within the series of systems (1000). The seismic acquisition system (1004) may obtain a seismic dataset generated during a seismic survey (100) as previously described in FIG. 1. The seismic dataset may be a pre-stack seismic dataset and may be physically transferred to the seismic processing system (1006) in the form of tape readers or high-capacity hard drives.

The seismic processing system (1006) may receive a pre-stack seismic dataset or a seismic velocity model of a subterranean region (102). The seismic processing system (1006) may be used to process a seismic dataset, including processing steps such as pre-processing, noise attenuation, near-surface corrections, velocity analysis, imaging, or attribute generation. In some embodiments the seismic processing system (1006) may be used to generate an adaptive migration taper. That is, the seismic processing system (1006) may be used to form a migrated seismic image using a migration function, a seismic velocity model, a pre-stack seismic dataset, and an adaptive migration taper. The migrated seismic image may be transferred to a seismic interpretation workstation (1008).

The seismic interpretation workstation (1008) may be used to determine a location of a hydrocarbon reservoir (104) (or other subterranean features) based on the migrated seismic image.

Knowledge of a location of a hydrocarbon reservoir (104) and other subterranean features may be transferred to a well planning system (950). The well planning system (950) may use information regarding the hydrocarbon reservoir (104) location to plan a wellbore path from the surface (116) of the earth to intersect the hydrocarbon reservoir (104).

Information regarding the planned wellbore path may be transferred to the drilling system (900) described in FIG. 9. The drilling system (900) may drill the wellbore along the planned wellbore path to access and produce the hydrocarbon reservoir (104).

Figure 11:
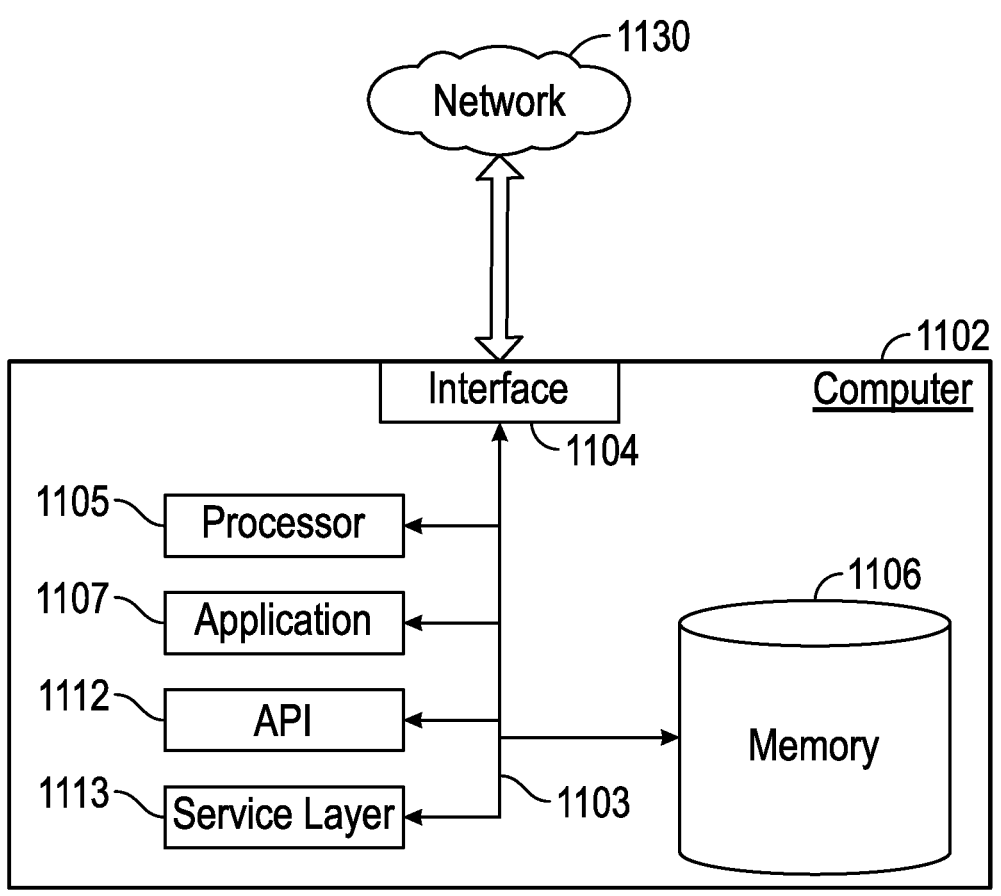
FIG. 11 shows a system in accordance with one or more embodiments.

Systems such as the seismic acquisition system (1004), the seismic processing system (1006), the seismic interpretation workstation (1008), and the wellbore planning system (950), may all include or be implemented on one or more computer systems such as the one shown in FIG. 11.

FIG. 11 shows a system in accordance with one or more embodiments. The computer system (1102) is used to provide computational functionalities associated with described algorithms, methods, functions, processes, flows, and procedures as described in the present disclosure, according to one or more embodiments. The illustrated computer (1102) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1102) may include a computer that includes an input device, such as a keypad, keyboard, touch screen, or other device that can accept user information, and an output device that conveys information associated with the operation of the computer (1102), including digital data, visual, or audio information (or a combination of information), or a graphical user interface (GUI).

The computer (1102) can serve in a role as a client, network component, a server, a database or other persistency, or any other component (or a combination of roles) of a computer system for performing the subject matter described in the instant disclosure. The illustrated computer (1102) is communicably coupled with a network (1130). For example, a generic computer (1102), seismic processing system (1006), and seismic interpretation workstation (1008) may be communicably coupled using a network (1130). In some implementations, one or more components of the computer (1102) may be configured to operate within environments, including cloud-computing-based, local, global, or other environment (or a combination of environments).

At a high level, the computer (1102) is an electronic computing device operable to receive, transmit, process, store, or manage data and information associated with the described subject matter. According to some implementations, the computer (1102) may also include or be communicably coupled with an application server, e-mail server, web server, caching server, streaming data server, business intelligence (BI) server, or other server (or a combination of servers).

The computer (1102) can receive requests over network (1130) from a client application, for example, executing on another computer (1102) and responding to the received requests by processing the said requests in an appropriate software application. For example, since seismic processing and seismic interpretation may be not be sequential, each computer (1102) system may receive requests over a network (1130) from any other computer (1102) and respond to the received requests appropriately. In addition, requests may also be sent to the computer (1102) from internal users (for example, from a command console or by other appropriate access method), external or third-parties, other automated applications, as well as any other appropriate entities, individuals, systems, or computers.

The computer (1102) includes an interface (1104). Although illustrated as a single interface (1104) in FIG. 11, two or more interfaces (1104) may be used according to particular needs, desires, or particular implementations of the computer (1102). The interface (1104) is used by the computer (1102) for communicating with other systems in a distributed environment that are connected to the network (1130). Generally, the interface (1104) includes logic encoded in software or hardware (or a combination of software and hardware) and operable to communicate with the network (1130). More specifically, the interface (1104) may include software supporting one or more communication protocols associated with communications such that the network (1130) or interface's hardware is operable to communicate physical signals within and outside of the illustrated computer (1102).

The computer (1102) also includes at least one computer processor (1105). Although illustrated as a single computer processor (1105) in FIG. 11, two or more processors may be used according to particular needs, desires, or particular implementations of the computer (1102). Generally, the computer processor (1105) executes instructions and manipulates data to perform the operations of the computer (1102) and any algorithms, methods, functions, processes, flows, and procedures as described in the instant disclosure.

The computer (1102) further includes a memory (1106) that holds data for the computer (1102) or other components (or a combination of both) that can be connected to the network (1130). For example, memory (1106) can be a database storing data consistent with this disclosure. Although illustrated as a single memory (1106) in FIG. 11, two or more memories may be used according to particular needs, desires, or particular implementations of the computer (1102) and the described functionality. While memory (1106) is illustrated as an integral component of the computer (1102), in alternative implementations, memory (1106) can be external to the computer (1102).

The application (1107) is an algorithmic software engine providing functionality according to particular needs, desires, or particular implementations of the computer (1102), particularly with respect to functionality described in this disclosure. For example, application (1107) can serve as one or more components, modules, applications, etc. Further, although illustrated as a single application (1107), the application (1107) may be implemented as multiple applications (1107) on the computer (1102). In addition, although illustrated as integral to the computer (1102), in alternative implementations, the application (1107) can be external to the computer (1102).

Each of the components of the computer (1102) can communicate using a system bus (1103). In some implementations, any or all of the components of the computer (1102), both hardware or software (or a combination of hardware and software), may interface with each other or the interface (1104) (or a combination of both) over the system bus (1103) using an application programming interface (API) (1112) or a service layer (1113) or a combination of the API (1112) and service layer (1113). The API (1112) may include specifications for routines, data structures, and object classes. The API (1112) may be either computer-language independent or dependent and refer to a complete interface, a single function, or even a set of APIs.

The service layer (1113) provides software services to the computer (1102) or other components (whether illustrated or not) that are communicably coupled to the computer (1102). The functionality of the computer (1102) may be accessible for all service consumers using this service layer. Software services, such as those provided by the service layer (1113), provide reusable, defined business functionalities through a defined interface. For example, the interface may be software written in JAVA, C++, or other suitable language providing data in extensible markup language (XML) format or another suitable format. While illustrated as an integrated component of the computer (1102), alternative implementations may illustrate the API (1112) or the service layer (1113) as stand-alone components in relation to other components of the computer (1102) or other components (whether or not illustrated) that are communicably coupled to the computer (1102). Moreover, any or all parts of the API (1112) or the service layer (1113) may be implemented as child or sub-modules of another software module, enterprise application, or hardware module without departing from the scope of this disclosure.

There may be any number of computers (1102) associated with, or external to, a computer system containing computer (1102), wherein each computer (1102) communicates over network (1130). For example, one computer system (1102) may be specifically configured for seismic processing and denoted a seismic processing system. Another computer system (1102) may be specifically configured for seismic interpretation and denoted a seismic interpretation workstation. In some embodiments, seismic processing such as Steps 602-608 of FIG. 5 may be conducted using a first computer (1102) and one or more first applications (1107) while seismic interpretation, such as Step 610 of FIG. 6, may be conducted on a second computer (1102) using one or more second applications (1107). Further, the term "client," "user," and other appropriate terminology may be used interchangeably as appropriate without departing from the scope of this disclosure. Moreover, this disclosure contemplates that many users may use one computer (1102), or that one user may use multiple computers (1102).

Although only a few example embodiments have been described in detail above, those skilled in the art will readily appreciate that many modifications are possible in the example embodiments without materially departing from this invention. Accordingly, all such modifications are intended to be included within the scope of this disclosure as limited only by the scope of the following claims.

What is claimed is:

1. A method comprising:
obtaining a pre-stack seismic dataset of a subterranean region;
obtaining a seismic velocity model of the subterranean region;
generating an adaptive migration taper based on the pre-stack seismic dataset comprising:
generating a dip-constrained weight function based on a maximum dip for a depth and a first taper length,
generating an adaptive weight function based on a depth index and a second taper length, and
combining the dip-constrained weight function and the adaptive weight function;
forming a migrated seismic image using a migration function, the seismic velocity model, the pre-stack seismic dataset, and the adaptive migration taper;
determining a location of a hydrocarbon reservoir based on the migrated seismic image;
planning a wellbore path to intersect the hydrocarbon reservoir; and
drilling a wellbore guided by the wellbore path.

2. The method of claim 1, wherein the depth index is determined from a migration impulse response.

3. The method of claim 1, wherein the first taper length and the second taper length are identical taper lengths.

4. The method of claim 1, wherein the adaptive migration taper comprises a vertical taper.

5. The method of claim 1, wherein the migration function is a Kirchhoff migration function based on an integral form of a wave equation that corresponds to pressure wave displacement and a pressure wave velocity as function of three-dimensional space and time.

6. The method of claim 1, wherein obtaining the seismic velocity model comprises performing velocity analysis on the pre-stack seismic dataset.

7. A system comprising:
a seismic acquisition system configured to obtain a pre-stack seismic dataset of a subterranean region;
a seismic processing system configured to:
receive the pre-stack seismic dataset,
receive a seismic velocity model of the subterranean region,
generate an adaptive migration taper based on the pre-stack seismic dataset comprising:
generate a dip-constrained weight function based on a maximum dip for a depth and a first taper length;
generate an adaptive weight function based on a depth index and a second taper length; and
combine the dip-constrained weight function and the adaptive weight function, and
form a migrated seismic image using a migration function, the seismic velocity model, the pre-stack seismic dataset, and the adaptive migration taper;
a seismic interpretation workstation configured to determine a location of a hydrocarbon reservoir based on the migrated seismic image;
a wellbore planning system configured to plan a wellbore path to intersect the hydrocarbon reservoir; and
a drilling system configured to drill a wellbore guided by the wellbore path.

8. The system of claim 7, wherein the depth index is determined from a migration impulse response.

9. The system of claim 7, wherein the migration function is a Kirchhoff migration function based on an integral form of a wave equation that corresponds to pressure wave displacement and a pressure wave velocity as function of three-dimensional space and time.

* * * * *